(12) United States Patent
Jenkins et al.

(10) Patent No.: US 7,090,248 B2
(45) Date of Patent: Aug. 15, 2006

(54) AIR BAG AND A METHOD OF FOLDING THE AIR BAG

(75) Inventors: Jeffrey A. Jenkins, Shelby Township, MI (US); Kurt F. Fischer, Oxford, MI (US); Ken Taggart, St. Clair Shores, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 228 days.

(21) Appl. No.: 10/861,018

(22) Filed: Jun. 4, 2004

(65) Prior Publication Data

US 2005/0269807 A1    Dec. 8, 2005

(51) Int. Cl.
*B60R 21/237*    (2006.01)

(52) U.S. Cl. ............... 280/743.1; 280/731; 280/728.1; 493/449

(58) Field of Classification Search ............ 280/743.1, 280/728.1, 731; 493/449, 457
See application file for complete search history.

(56) References Cited

U.S. PATENT DOCUMENTS

| | | | |
|---|---|---|---|
| 5,425,551 A * | 6/1995 | Hawthorn ............... | 280/743.1 |
| 5,560,648 A * | 10/1996 | Rhule et al. ............. | 280/731 |
| 5,605,350 A * | 2/1997 | Bates et al. ............ | 280/743.1 |
| 5,690,358 A | 11/1997 | Marotzke | |
| 5,795,284 A * | 8/1998 | Berti ..................... | 493/405 |
| 5,960,611 A | 10/1999 | Aigner et al. | |
| 6,286,866 B1 * | 9/2001 | Satge et al. ............. | 280/743.1 |
| 6,994,664 B1 * | 2/2006 | Nishijima et al. ......... | 493/449 |
| 2005/0206141 A1 * | 9/2005 | Ishikawa et al. .......... | 280/731 |

OTHER PUBLICATIONS

U.S. Appl. No. 08/956,716, filed Oct. 23, 1997 entitled "A Method of Folding a Gas Bag for a Vehicle Occupant Restraint System, a Folded Gas Bag for a Vehicle Occupant Restraint System and a Device for Performing the Method".

* cited by examiner

*Primary Examiner*—Ruth Ilan
(74) *Attorney, Agent, or Firm*—Tarolli, Sundheim, Covell & Tummino LLP

(57) ABSTRACT

An inflatable vehicle occupant protection device (12) is located on a steering wheel (14) and includes a lower portion (28) and an upper portion (26). The upper portion (26) is rolled folded and the lower portion (28) is folded in a star pattern. The roll folded portion (26) has an outside surface formed by a front panel (30) of the inflatable vehicle occupant protection device (12) that is intended to face the occupant when the inflatable vehicle occupant protection device is inflated. During inflation, the roll folded portion (26) unrolls such that at least a portion of the inflatable vehicle occupant protection device inflates forward of the steering wheel if the inflatable vehicle occupant protection device, while inflating, encounters an obstruction located too far forward relative to the steering wheel. A method of folding the inflatable vehicle occupant protection device (12) includes folding at least a lower portion (28) in a star pattern and rolling an upper portion (26) to form a roll having an outside surface formed by a front surface (30) of the inflatable vehicle occupant protection device (12).

13 Claims, 5 Drawing Sheets

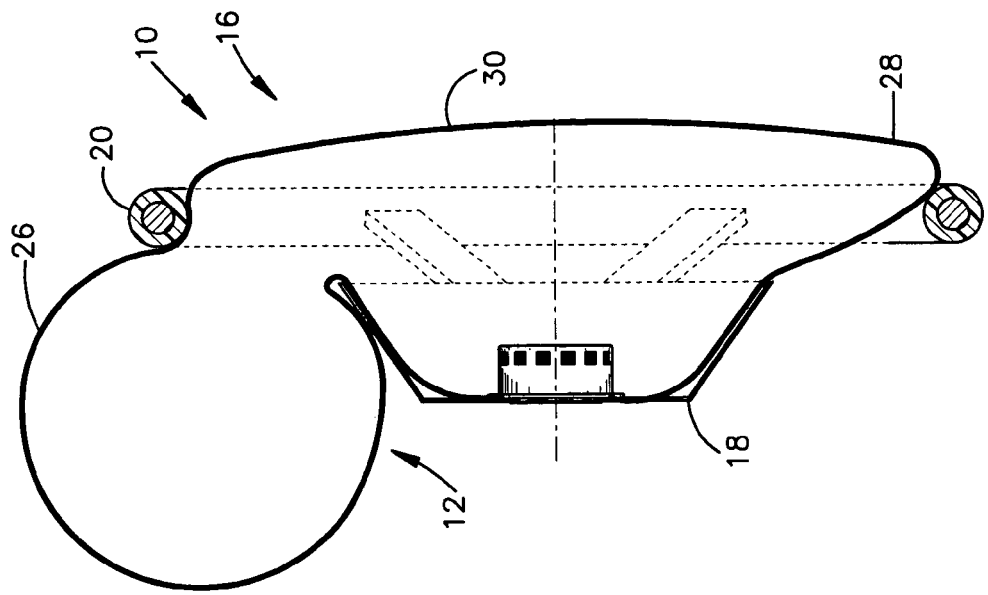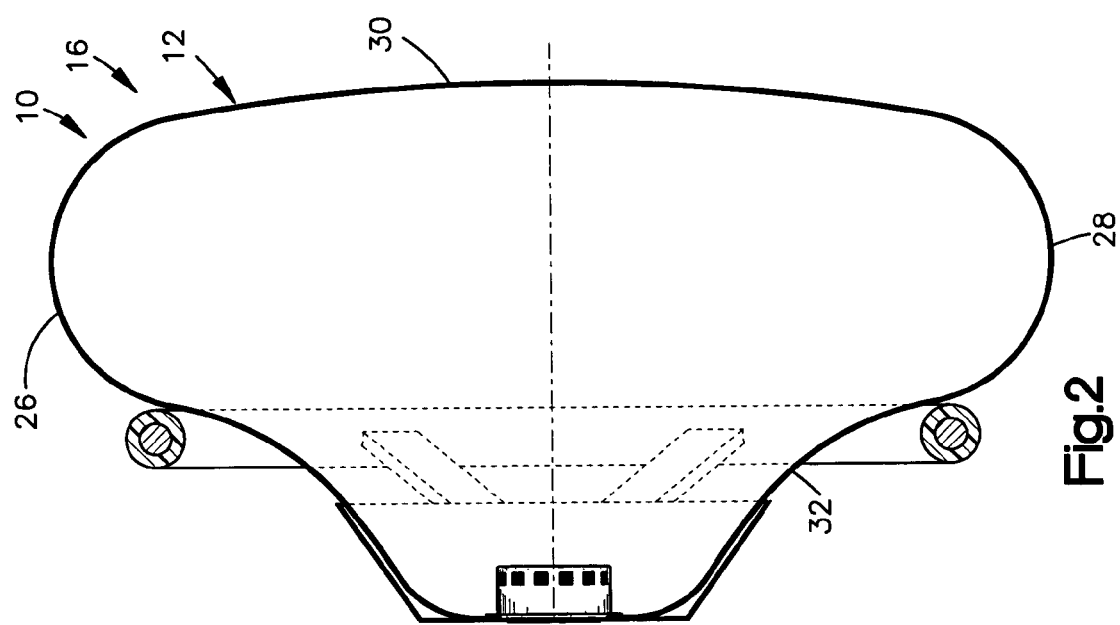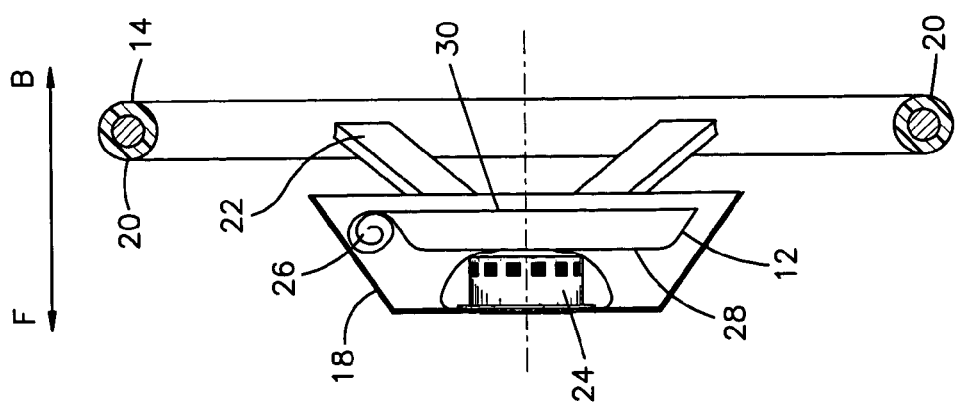

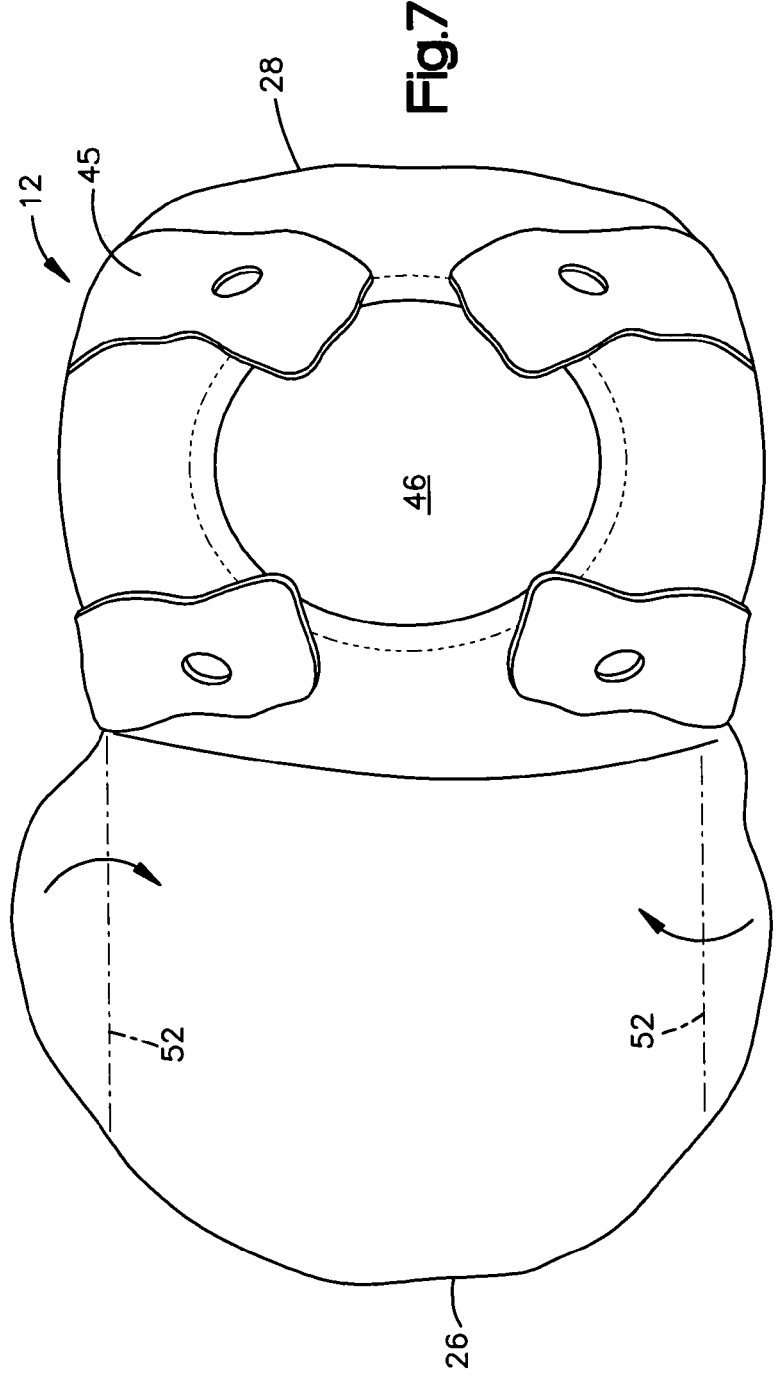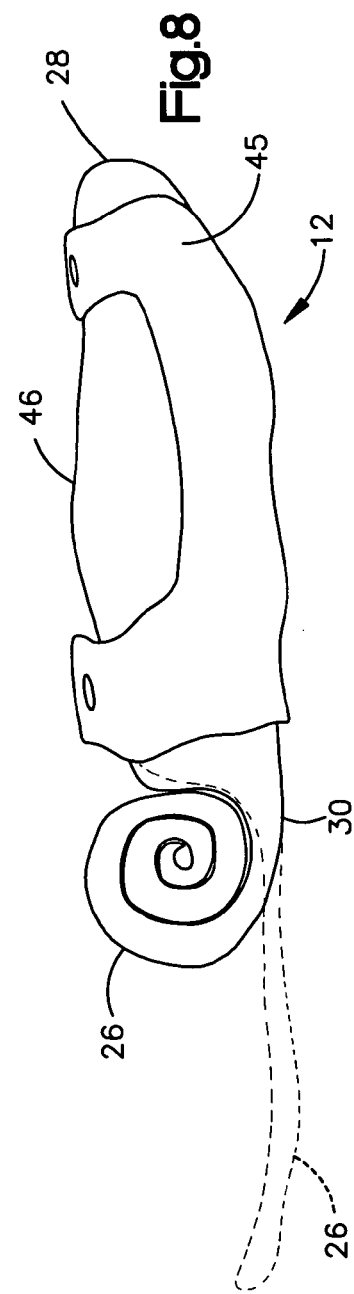

AIR BAG AND A METHOD OF FOLDING THE AIR BAG

TECHNICAL FIELD

The present invention is directed to an inflatable vehicle occupant protection device for location on a steering wheel of a vehicle and to a method for folding the inflatable vehicle occupant protection device.

BACKGROUND OF THE INVENTION

Inflatable vehicle occupant protection devices, also known as air bags, are well known in the art as a means for helping protect an occupant of a vehicle. In a vehicle equipped with an inflatable vehicle occupant protection device located on the steering wheel, an occupant of a vehicle may sometimes be seated too far forward relative to the steering wheel. If, as a result of a vehicle crash, the inflatable vehicle occupant protection device is inflated with the occupant of the vehicle in this position, the occupant may experience increased forces when striking the inflating inflatable vehicle occupant protection device as compared to an occupant who is not seated too far forward relative to the steering wheel.

SUMMARY OF THE INVENTION

In accordance with the present invention, an inflatable vehicle occupant protection device, for location on a steering wheel, includes a lower portion and an upper portion. The upper portion is roll folded and the lower portion is folded into a star pattern. The roll folded portion has an outside surface formed by a front surface of the inflatable vehicle occupant protection device that is intended to face the occupant when the inflatable vehicle occupant protection device is inflated. During inflation, the roll folded portion unrolls in a direction such that at least a portion of the inflatable vehicle occupant protection device inflates forward of the steering wheel if the vehicle occupant protection device, while inflating, encounters an obstruction located too far forward relative to the steering wheel.

In accordance with another aspect of the present invention, a method of folding the inflatable vehicle occupant protection device for location on a steering wheel includes the step of folding at least a lower portion in a star pattern. The method also includes the step of rolling an upper portion to form a roll having an outside surface formed by a front surface of the inflatable vehicle occupant protection device that is intended to face the occupant. As a result, during inflation, the roll folded portion unrolls in a direction such that at least a portion of the inflatable vehicle occupant protection device inflates forward of the steering wheel if the vehicle occupant protection device, while inflating, encounters an obstruction located too far forward relative to the steering wheel.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic illustration of an apparatus according to an embodiment of the invention;

FIG. 2 is a schematic view of the apparatus of FIG. 1 illustrating some parts in another condition;

FIG. 3 is a schematic view of the apparatus of FIG. 1 illustrating some parts in yet another condition;

FIGS. 4–8 illustrate a first method of folding an inflatable occupant protection device according to the invention.

DESCRIPTION OF PREFERRED EMBODIMENT

Figure 4:
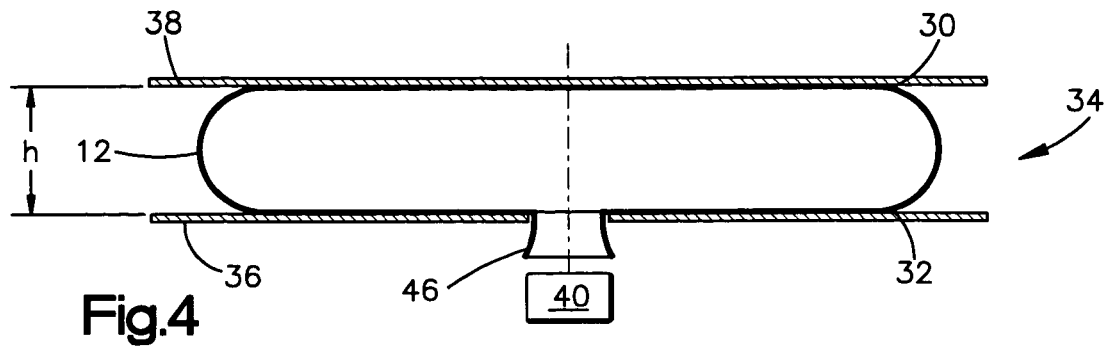

Throughout this description, the phrase "behind the steering wheel in the vehicle", or the like, is defined as a location in a vehicle between the occupant and the vehicle steering wheel. Likewise, throughout this description, the phrase "forward of the steering wheel in the vehicle", or the like, is defined as a location in the vehicle between the vehicle steering wheel and the vehicle instrument panel.

As representative of the invention, FIG. 1 illustrates an apparatus 10 including an inflatable vehicle occupant protection device, or air bag, 12 in a folded condition located on a steering wheel 14 of a vehicle 16.

The steering wheel includes a hub 18, a rim 20 and at least one spoke 22 interconnecting the rim and the hub. The hub 18 contains an air bag module (not shown). The air bag module houses the air bag 12 as well as an inflation fluid source 24 for providing inflation fluid to inflate the air bag 12.

The air bag 12 is circular when inflated and viewed by the occupant. The air bag 12 has an upper portion 26 and a lower portion 28 as shown in FIG. 2. The perimeter of the upper portion 26 extends between about the ten o'clock and two o'clock positions relative to the circumference of the air bag, and the perimeter of the lower portion 28 constitutes the remainder of the circumference of the air bag 12. The lower portion 28 is folded in a star pattern and the upper portion 26 is roll folded.

As shown schematically in FIG. 1, the air bag is oriented on the steering wheel 14 so that the roll folded upper portion 26 is immediately adjacent an upper portion of the steering wheel rim 20 and the star folded bottom portion 28 is immediately adjacent the middle and lower portions of the steering wheel rim 20.

The air bag 12 has front and rear circular fabric panel portions 30, 32 (FIG. 2), which are sewn together. The roll folded portion has an outside surface formed by the front panel 30 of the air bag 12 that is intended to face the occupant when the air bag 12 is inflated.

The air bag 12 has first and second different inflated conditions. FIG. 2 illustrates the air bag 12 in the first inflated condition. The air bag 12 inflates in the direction of the path of least resistance to unfolding during inflation. For the air bag 12 to inflate into the first inflated condition, the occupant is seated at a normal distance in the vehicle seat relative to the steering wheel 14, i.e., the occupant is not located too far forward in the vehicle relative to the steering wheel.

To achieve the first inflated condition, the air takes the path of least resistance to unfolding during inflation by inflating in the rearward direction of vehicle travel and becomes inflated to a location behind the steering wheel rim 20 (indicated by directional arrow B in FIG. 1). Thus, during inflation, the rolled upper portion 26 unrolls and the star folded bottom portion 28 unfolds by inflating in the rearward direction of vehicle travel to a location behind the steering wheel rim 20.

In the first inflated condition, most of the air bag volume is located behind the steering wheel rim 20 in the vehicle.

The inflated air bag 12 has a circular configuration overlying the steering wheel rim 20. The front panel 30 is an impact surface against which the occupant strikes. The air bag restrains the occupant when the occupant strikes the air bag.

FIG. 3 illustrates the air bag 12 in a second inflated condition. The air bag 12 inflates into the second condition if the vehicle occupant is seated too far forward in the vehicle seat relative to the steering wheel 14.

If the occupant is seated too far forward in the vehicle, the occupant is an obstruction to the air bag 12 inflating to a location behind the steering wheel rim 20 in the vehicle. The air bag 12 inflates in the direction of the path of least resistance to unfolding during inflation. If the inflating air bag 12 encounters an obstruction, i.e., the occupant, during inflation, the path of least resistance to unfolding of the air bag during inflation is to the front of the steering wheel rim 20 by inflating in the forward direction of vehicle travel. Specifically, the path of least resistance to unfolding is to the front of the upper rim region of the steering wheel rim 20 when viewed in FIG. 3 (indicated by directional arrow F in FIG. 1). Thus, during inflation, the rolled upper portion 26 unrolls such that at least a portion inflates forward of the steering wheel rim 20 in the vehicle 16 because the air bag 12, while inflating, encounters an obstruction located too far forward relative to the steering wheel.

In the second inflated condition; most of the air bag volume, approximately 80%, is redirected upon the air bag encountering the occupant during inflation to a location forward of the upper rim of the steering wheel 14 (FIG. 3) by inflating in the forward direction of vehicle travel. Only about 20% of the air bag volume inflates to a location behind the steering wheel rim 20 (indicated by directional arrow B in FIG. 1). The inflated air bag 12 includes a substantial circumferential extent perpendicular to the plane of the paper such that a large portion of the 80% air bag volume extends perpendicular to the plane of the paper as viewed in FIG. 3.

It is known in the art that steering wheel rims bend somewhat upon impact by an occupant in a vehicle crash to absorb some of the impact force from the occupant. In the second inflated condition, it is desirable for an occupant seated too far forward relative to the steering wheel to strike the steering wheel rim 20 instead of the air bag 12 at the rim location. In a crash situation where the occupant is located too far forward in the vehicle seat, the force of the air bag inflating to a location behind the steering wheel and striking the occupant is greater than the force of the occupant striking the steering wheel rim 20. Thus, in the second inflated condition, an occupant located too far forward in the vehicle seat experiences reduced impact forces because the occupant may strike the steering wheel rim 20 instead of the air bag 16 at the rim location.

FIGS. 4–8 illustrate a first method of folding the air bag 12 according to the invention. An air bag folding apparatus 34 includes a bottom plate 36 spaced apart from and parallel to an overlying top plate 38. The apparatus 34 includes a fan 40 (FIG. 4). The fan 40 provides a slow, low pressure filling of the air bag 12. The fan 40 partially inflates the air bag 12 at the beginning of the folding process.

Figure 5:
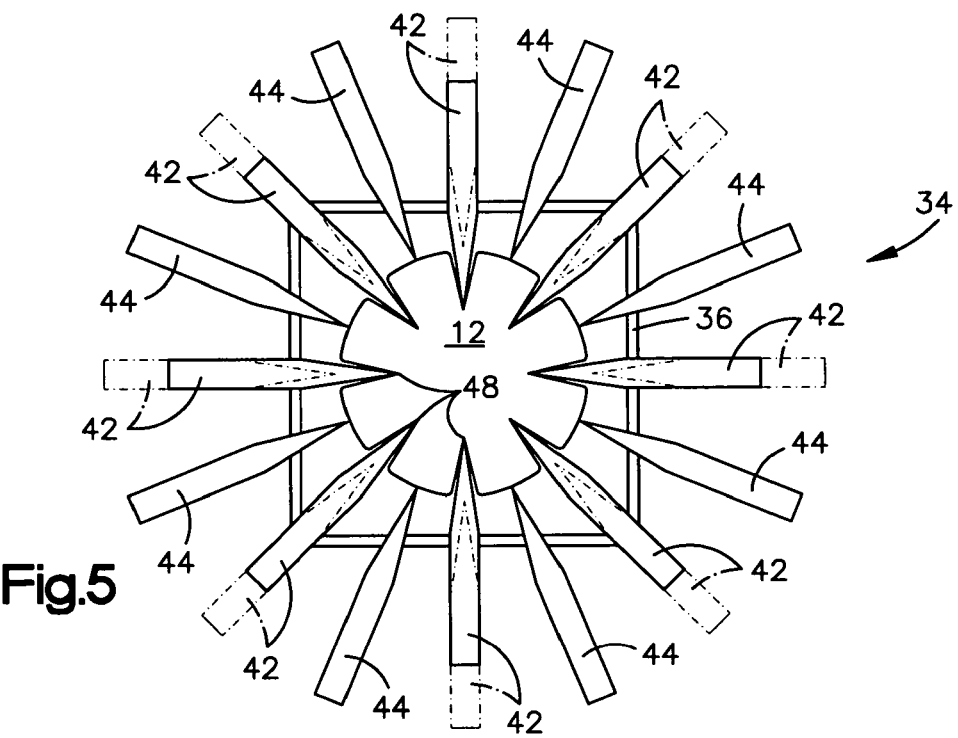

The apparatus 34 also includes two sets of folding paddles 42, 44 (FIG. 5). The paddles 42 of a first set of paddles are located equally spaced apart from each other around the circumference of the air bag 12. The paddles 44 of a second set of paddles are also located equally spaced apart from each other around the circumference of the air bag 12, with individual paddles 44 located between adjacent paddles 42. Both the paddles 42 and the paddles 44 have a height approximately equal to the distance (h) between the top and bottom plates 38, 36 (FIG. 4).

The circular air bag 12 is placed in a flattened condition on the bottom plate 36 of the apparatus 34, and the inflation fluid inlet 46 on the air bag is secured to the fan 40. Subsequently, the top plate 38 is located over the air bag 12 at a predetermined distance from the bottom plate 36. The air bag 12 is then partially inflated by the fan 40. The rear panel 32 of the air bag 12 engages the bottom panel 36 of the apparatus 34 and the front panel 30 of the air bag engages the top plate 38 of the apparatus.

FIG. 5 shows a schematic plan view of the partially inflated air bag in FIG. 4, as well as the first and second sets of folding paddles 42, 44 around the air bag 12. The folding paddles 42 of the first set move radially inward toward the center of the air bag 12 and remain in contact with the air bag. At the same time, some of the air inside the air bag is pushed out by the paddles 42. The paddles 42 produce a first set of folds 48 in the air bag extending perpendicularly to and between the top and bottom plates 38, 36.

Figure 6:
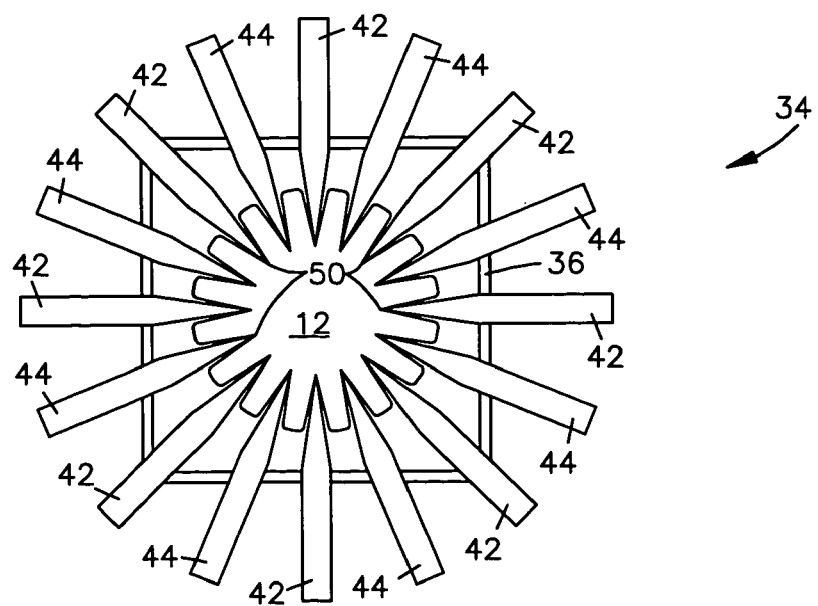

Subsequently, the paddles 44 of the second set move radially inward toward the center of the air bag 12 (FIG. 6). The paddles 42 remain in contact with the air bag 12 while the paddles 44 fold the air bag. At the same time, more of the air inside the air bag 12 is pushed out by the paddles 44 so that the air bag 12 is substantially deflated. The paddles 44 form a second set of folds 50 in the air bag 12 extending perpendicularly to and between the top and bottom plates 38, 36.

The first and second sets of folds 48, 50 produced by the first and second set of folding paddles 42, 44 form a star folded pattern in the air bag 12. At this point in the folding process, the entire air bag 12, i.e. both the upper and lower portions 26, 28, is star folded.

During a subsequent packaging step (not shown) the folded air bag is secured within a cover 45. The cover 45 is partially shown in FIG. 7. The top plate 38 is also removed, and the covered packaged air bag 12 is removed from the apparatus 34. The covered air bag is turned over to expose the inlet opening 46 on its underside.

The upper portion 26 of the air bag 12 is then manually removed from the cover 45 and unfolded to an extended position (FIG. 7). The extended upper portion 26 is manually folded inward lengthwise toward the underside of the bag 12 (along dotted lines 52), and as indicated by the arrows. Next, as shown in FIG. 8, the upper bag portion 26 is manually rolled toward the inlet opening 46, starting at the periphery of the air bag 12 and ending near the inlet opening.

The roll folded portion 26 has an outer surface formed by the front panel 30 of the air bag 12 that is intended to face the occupant. During inflation of the air bag, therefore, the roll unrolls in a direction such that at least a portion of the air bag inflates to a location forward of the steering wheel 14 of the air bag if the air bag, while inflating, encounters an obstruction located too far forward relative to the steering wheel.

In a last step of the folding process, the rolled portion is tucked into the cover 45. The finished folded air bag 12 has both a star folded pattern in the lower portion 28 and a rolled upper portion 26 (FIG. 1).

Figure 9:
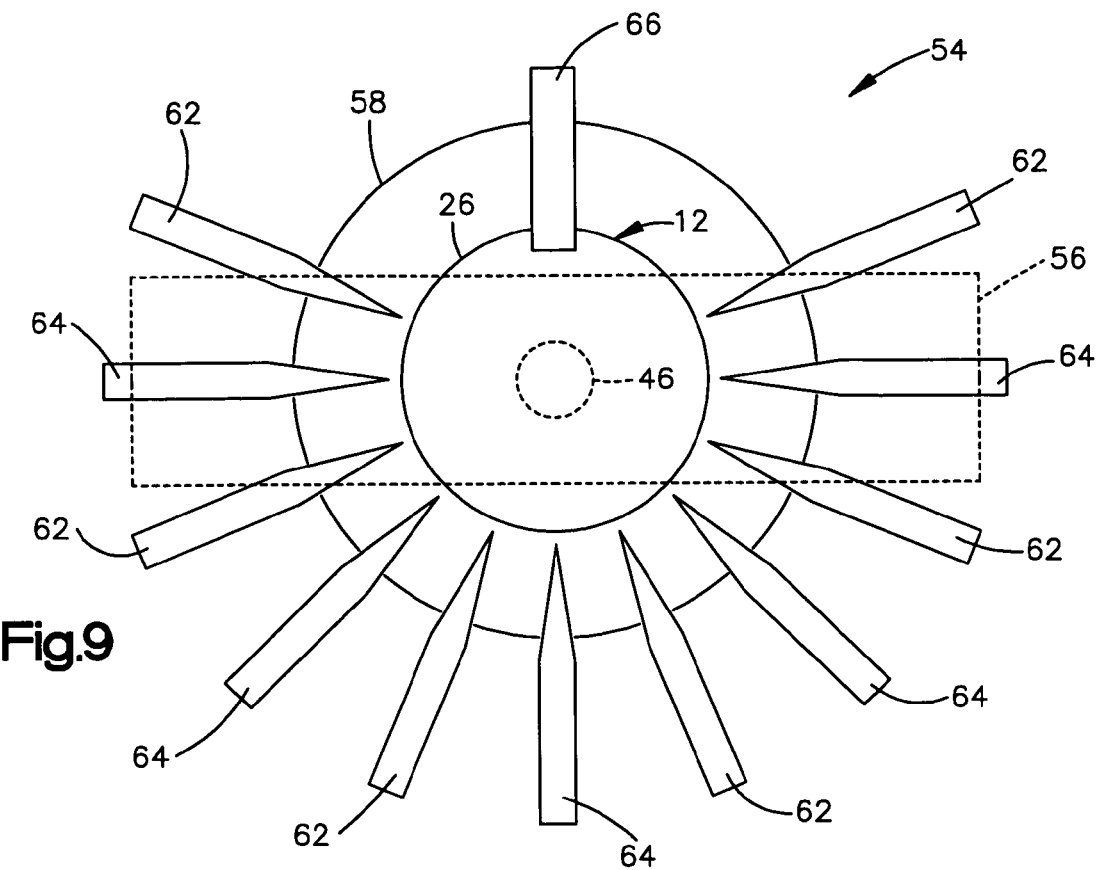
FIGS. 9–12 illustrate a second method of folding an inflatable occupant protection device according to the invention.

FIGS. 9–12 illustrate a second method of folding the air bag 12 according to the invention. The air bag folding apparatus 54 is similar to the air bag folding apparatus 34. The air bag folding apparatus 54 includes top and bottom plates 56, 58 (FIG. 9). A fan (not shown) is provided for partially inflating the air bag during the folding process. The apparatus 54 includes two sets of folding paddles 62, 64.

The paddles 62 of the first set are located equally spaced apart from each other around a portion of the circumference of the air bag 12. The paddles 64 of the second set are also located equally spaced apart from each other around a portion of the circumference of the air bag 12, with individual paddles 64 located between adjacent paddles 62. Both the paddles 62 and the paddles 64 have a height equal to the distance between the top and bottom plates 56, 58.

The circular air bag 12 is placed in a flattened condition on the bottom plate 58, and the inlet opening 46 is secured to the fan. Subsequently, the top plate 56 is moved over the air bag 12 and is located at a distance from the bottom plate 58.

The air bag 12 is then partially inflated between the top and bottom plates 56, 58 by the fan. The rear panel 32 of the air bag 12 engages the bottom plate 58 of the apparatus 54 and the front panel 30 of the air bag 12 engages the top plate 56 of the apparatus.

The air bag folding apparatus 54 also includes a clamp 66 (FIG. 9) located adjacent the upper portion 26 of the air bag 12 at the twelve o'clock position. The clamp 66 clamps the upper portion 26 of the air bag 12 to hold the upper portion 26 of the air bag during the subsequent folding steps.

Figure 10:
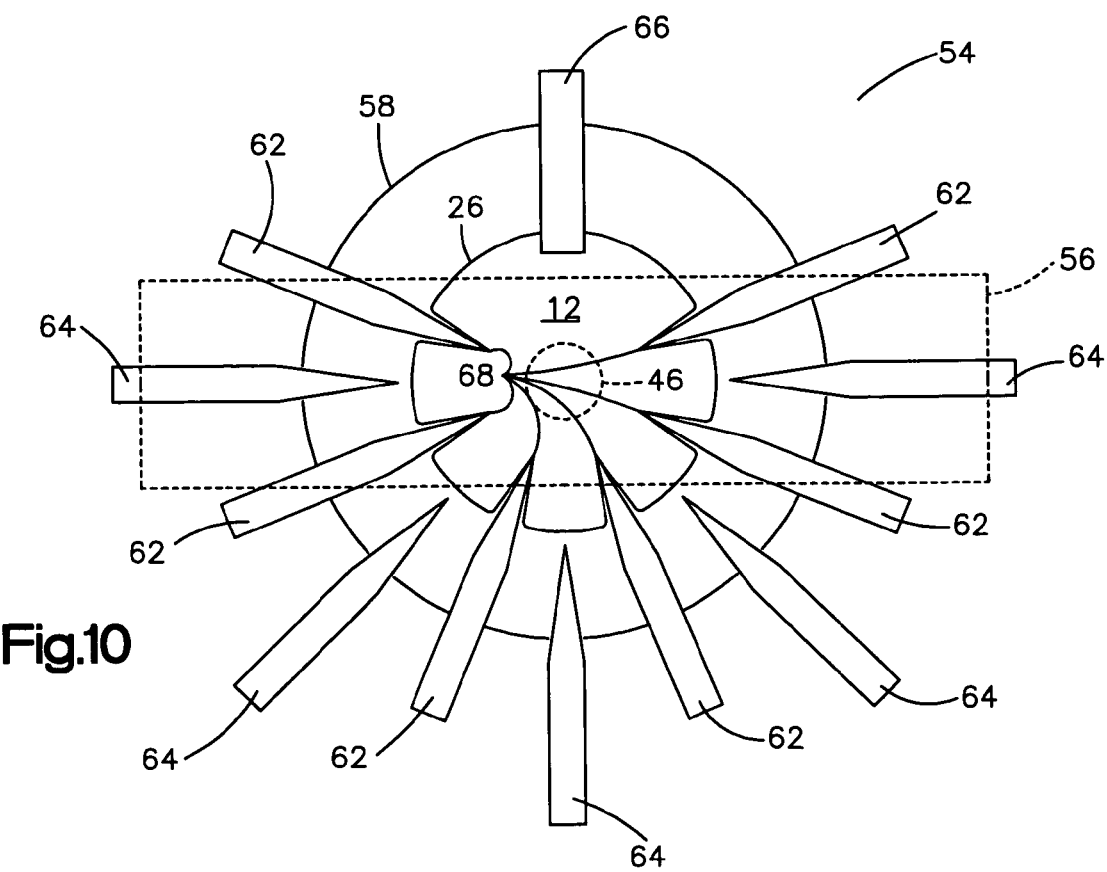

As shown in FIG. 10, the first and second sets of folding paddles 62, 64 in the apparatus 54 fold only the lower portion 28 of the air bag 12 into a star pattern during the folding process. The folding paddles 62 move radially inward toward the center of the air bag 12. At the same time, some of the air inside the air bag 12 is pushed out by the paddles 62. The paddles 62 produce a first set of folds 68 in the air bag 12 extending perpendicularly to and between the top and bottom plates 56, 58.

Figure 11:
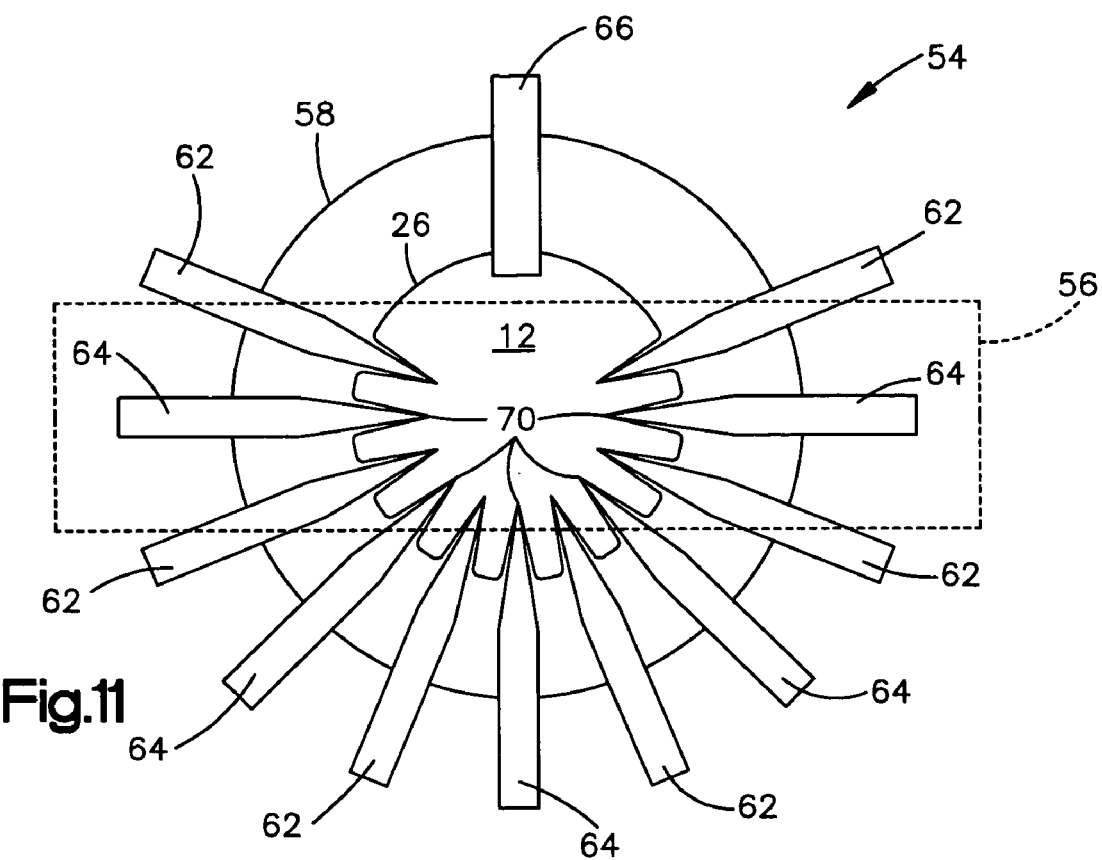

Subsequently, the folding paddles 64 of the second set move radially inward toward the center of the air bag (FIG. 11). The paddles 62 remain in contact with the air bag 12 while the paddles 64 fold the air bag. At the same time, more of the air inside the air bag 12 is pushed out by the paddles 64 so that the air bag 12 is substantially deflated. The paddles 64 produce a second set of folds 70 in the air bag 12 extending perpendicularly to and between the top and bottom plates 56, 58. The first and second sets of folds 68, 70 produced by the first and second set of folding paddles 62, 64 form the star folded lower portion of the air bag 12.

Figure 12:
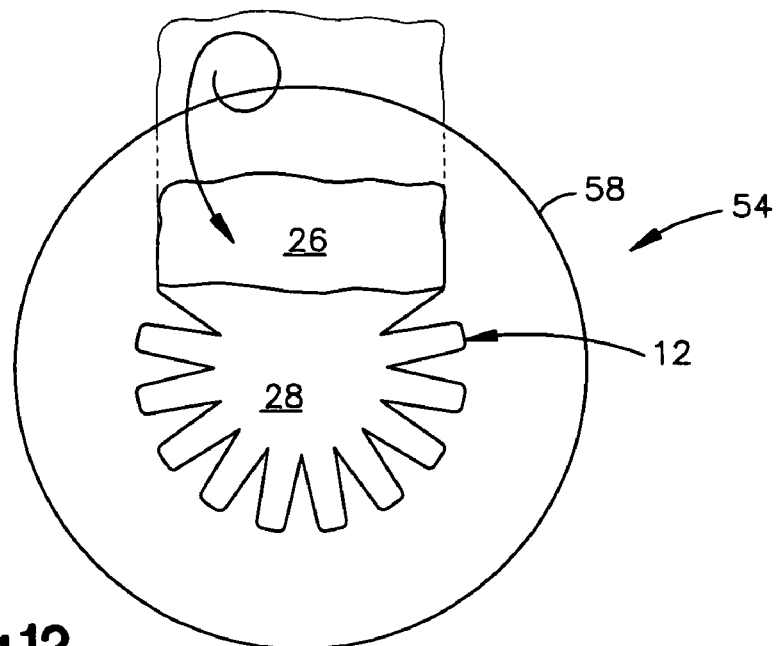

Next, the top plate 56 is removed, and the clamp 66 is unclamped from the upper portion 26 of the air bag 12 to release the upper portion 26 of the air bag (FIG. 12). The upper portion 26 of the air bag 12 is then rolled in a direction underneath the air bag toward the center starting at the periphery and ending near the center of the air bag 12, as indicated by the arrow.

The rolled folded portion has an outer surface formed by the front surface 30 of the air bag 12 that is intended to face the occupant. During inflation of the air bag, therefore, the roll unrolls in a direction such that at least a portion of the air bag inflates to a location forward of the steering wheel if the air bag, while inflating, encounters an obstruction located too far forward relative to the steering wheel.

During the final packaging step, the finished folded air bag 12 has both a rolled upper portion 26 and a star folded lower portion 28 and is identical to the finished folded air bag 12 (FIG. 1) formed by the first method according to FIGS. 4–8.

From the above description of the invention, those skilled in the art will perceive improvements, changes and modifications. Such improvements, changes and modifications within the skill of the art are intended to be covered by the appended claims.

Having described the invention, the following is claimed:

1. An inflatable vehicle occupant protection device for location on a steering wheel for helping to protect an occupant of a vehicle, said inflatable vehicle occupant protection device comprising:

a lower portion and an upper portion, said upper portion being roll folded and said lower portion being folded into a star pattern, said roll folded portion having an outside surface formed by a front surface of said inflatable vehicle occupant protection device that is intended to face the occupant when said inflatable vehicle occupant protection device is inflated so that, during inflation of said inflatable vehicle occupant protection device, said roll folded portion unrolls in a direction such that at least a portion of said inflating inflatable vehicle occupant protection device inflates forward of the steering wheel if the inflatable vehicle occupant protection device, while inflating, encounters an obstruction located too far forward relative to the steering wheel.

2. The inflatable vehicle occupant protection device according to claim 1 further comprising a rear surface and wherein said star folded pattern comprises a plurality of folds in said lower portion extending perpendicularly to said front and rear surfaces around a partial perimeter of said inflatable vehicle occupant protection device.

3. The inflatable vehicle occupant protection device according to claim 1 wherein said inflatable vehicle occupant protection device is oriented on said steering wheel so that said upper portion is adjacent an upper rim of said steering wheel and said lower portion is adjacent the remainder of said steering wheel rim.

4. The inflatable vehicle occupant protection device according to claim 1 wherein, if said inflating inflatable vehicle occupant protection device does not encounter an obstruction while inflating, said inflatable vehicle occupant protection device inflates behind the steering wheel in the vehicle.

5. A method of folding an inflatable vehicle occupant protection device for location on a steering wheel for helping to protect an occupant of a vehicle, said inflatable vehicle occupant protection device when inflated comprising a lower portion and an upper portion, said method comprising the steps of:

folding at least said lower portion of said inflatable vehicle occupant protection device in a star pattern, and rolling said upper portion of said inflatable vehicle occupant protection device to form a roll having an outside surface formed by a front surface of said inflatable vehicle occupant protection device that is intended to face the occupant when said inflatable vehicle occupant protection device is inflated so that, during inflation of said inflatable vehicle occupant protection device, said roll folded portion unrolls in a direction such that at least a portion of said inflatable vehicle occupant protection device inflates forward of the steering wheel if the inflatable vehicle occupant protection device, while inflating, encounters an obstruction located too far forward relative to the steering wheel.

6. The method according to claim 5 wherein said inflatable vehicle occupant protection device is circular and further comprising, preceding the step of folding at least said lower portion in a star pattern, the step of placing said inflatable vehicle occupant protection device between two spaced apart plates, and at least partially inflating said inflatable vehicle occupant protection device between said two plates to engage said two plates by directing air from a fan into said inflatable vehicle occupant protection device.

7. The method according to claim 6 further comprising, preceding the step of placing said inflatable vehicle occupant protection device between two spaced apart plates, the step of clamping only said upper portion so that said upper portion is not folded in said star pattern and releasing said clamping of said upper portion of said inflatable vehicle occupant protection device prior to the step of rolling said upper portion.

8. The method according to claim 7 wherein the step of folding at least said lower portion in a star pattern includes the step of moving a first plurality of folding paddles, arranged around at least a portion of the perimeter of said inflatable vehicle occupant protection device, into the inflatable vehicle occupant protection device to produce a first set of folds extending perpendicularly to and between said two plates.

9. The method according to claim 8 wherein the step of folding at least said lower portion in a star pattern includes the step of moving a second plurality of folding paddles, arranged around at least a portion of the perimeter of said inflatable vehicle occupant protection device and between the first plurality of folding paddles, into the inflatable vehicle occupant protection device to produce a second set of folds extending perpendicularly to and between said two plates.

10. The method according to claim 9 wherein the step of folding at least said lower portion in a star pattern includes the step of leaving said first plurality of folding paddles in the first set of folds while moving the second plurality of folding paddles into said inflatable vehicle occupant protection device.

11. The method according to claim 7 further comprising, preceding the step of rolling said inflatable vehicle occupant protection device, the step of removing at least one of said two plates.

12. The method according to claim 5 wherein the step of folding at least the lower portion of said inflatable vehicle occupant protection device in a star pattern includes the step of folding both said upper and lower portions of said inflatable vehicle occupant protection device in a star pattern.

13. The method according to claim 12 further comprising, after the step of folding both the upper and lower portions of said inflatable vehicle occupant protection device in a star pattern, the step of unfolding only the upper portion and thereafter rolling the upper portion.

* * * * *